United States Patent
Shimada et al.

(10) Patent No.: US 8,438,176 B2
(45) Date of Patent: May 7, 2013

(54) INFORMATION PROCESSING SYSTEM, APPARATUS, METHOD, AND RECORDING MEDIUM OF PROGRAM

(75) Inventors: Kuniaki Shimada, Kawasaki (JP); Yukihiro Watanabe, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/049,216

(22) Filed: Mar. 16, 2011

(65) Prior Publication Data
US 2011/0231421 A1    Sep. 22, 2011

(30) Foreign Application Priority Data

Mar. 19, 2010 (JP) .................................. 2010-64084

(51) Int. Cl.
*G06F 17/30* (2006.01)
(52) U.S. Cl.
USPC ............ 707/758; 707/809; 709/224; 709/225
(58) Field of Classification Search .................... 707/758
See application file for complete search history.

(56) References Cited

U.S. PATENT DOCUMENTS

| | | | | |
|---|---|---|---|---|
| 5,822,523 A | * | 10/1998 | Rothschild et al. ........... | 709/236 |
| 6,032,162 A | * | 2/2000 | Burke ........................... | 715/207 |
| 6,611,873 B1 | * | 8/2003 | Kanehara ....................... | 709/238 |
| 6,718,326 B2 | * | 4/2004 | Uga et al. ............................... | 1/1 |
| 7,933,268 B1 | * | 4/2011 | Melman et al. ................ | 370/389 |
| 2003/0046311 A1 | * | 3/2003 | Baidya et al. .................. | 707/200 |
| 2004/0078384 A1 | * | 4/2004 | Keir et al. ...................... | 707/102 |
| 2006/0221957 A1 | * | 10/2006 | Ozawa et al. .................. | 370/389 |
| 2007/0130135 A1 | * | 6/2007 | Hagiuda ........................... | 707/4 |
| 2008/0250128 A1 | * | 10/2008 | Sargent ......................... | 709/223 |
| 2009/0083259 A1 | | 3/2009 | Morita | |

FOREIGN PATENT DOCUMENTS

| | | |
|---|---|---|
| JP | 2002-366838 | 12/2002 |
| JP | 2005-099890 | 4/2005 |
| JP | 2009-80598 | 4/2009 |

* cited by examiner

*Primary Examiner* — Binh V Ho
(74) *Attorney, Agent, or Firm* — Staas & Halsey LLP

(57) ABSTRACT

An apparatus includes: an obtaining unit to obtain a plurality of addresses in order, and a storage unit to store a first group of addresses included in the plurality of addresses and obtained before a certain address is obtained by the obtaining unit, and to store a second group of addresses included in the plurality of addresses and obtained after the certain address is obtained by the obtaining unit. An extracting unit extracts one or more addresses from the first group of addresses when the obtaining unit further obtains an address that matches any address of the first group of addresses, or extracts one or more addresses of the second group of addresses when the obtaining unit further obtains an address that matches any address of the second group of addresses, wherein the one or more extracted addresses are other than the matched address.

10 Claims, 24 Drawing Sheets

FIG. 5

|  | ADDRESS | IDENTIFICATION INFORMATION |
|---|---|---|
| ac1 ----------> | URL1 | A |
| ac2 ----------> | URL2 | A |
| ac3 ----------> | URL3 | A |
| ac4 ----------> | URL4 | A |
| ac5 ----------> | URL5 | B |
| ac6 ----------> | URL6 | B |
| ac7 ----------> | URL7 | B |
| ac8 ----------> | URL1 | A |
| ac9 ----------> | URL9 | A |
| ac10 ---------> | URL10 | A |

FIG. 11

| INCIDENT ID | ADDRESS |
|---|---|
| 20080101-0001 | FILE1 |
| 20080101-0001 | URL1 |
| 20080101-0001 | URL2 |
| 20080101-0002 | URL2 |
| 20080101-0002 | FILE2 |
| 20080101-0002 | URL1 |
| 20080101-0002 | URL4 |
| 20080102-0001 | FILE3 |
| 20080102-0001 | URL5 |
| 20080102-0002 | URL1 |

| ADDRESS | URL1 | URL2 | URL3 | URL4 | URL5 | FILE1 | FILE2 | FILE3 | SUM |
|---|---|---|---|---|---|---|---|---|---|
| URL1 | - | 2 | 0 | 1 | 1 | 2 | 1 | 0 | 7 |
| URL2 | 2 | - | 0 | 1 | 0 | 1 | 1 | 0 | 6 |
| URL3 | 0 | 0 | - | 1 | 0 | 0 | 0 | 0 | 1 |
| URL4 | 1 | 1 | 1 | - | 0 | 0 | 1 | 1 | 4 |
| URL5 | 1 | 0 | 0 | 0 | - | 1 | 0 | 0 | 3 |
| FILE1 | 2 | 1 | 0 | 1 | 1 | - | 0 | 0 | 4 |
| FILE2 | 1 | 1 | 0 | 1 | 0 | 0 | - | 0 | 3 |
| FILE3 | 0 | 0 | 0 | 0 | 1 | 0 | 0 | - | 1 |

| ADDRESS | ADDRESS[1] | COUNTED VALUES[1] | ADDRESS[2] | COUNTED VALUES[2] | ADDRESS[3] | COUNTED VALUES[3] |
|---|---|---|---|---|---|---|
| URL1 | FILE1 | 2 | URL2 | 2 | URL4 | 1 |
| URL2 | URL1 | 2 | URL4 | 1 | FILE1 | 1 |
| URL3 | URL4 | 1 | | | | |
| URL4 | URL1 | 1 | URL2 | 1 | URL3 | 1 |
| URL5 | URL1 | 1 | FILE1 | 1 | FILE3 | 1 |
| FILE1 | URL1 | 2 | URL2 | 1 | URL5 | 1 |
| FILE2 | URL1 | 1 | URL2 | 1 | URL4 | 1 |
| FILE3 | URL5 | 1 | | | | |

| ADDRESS | ADDRESS[1] | COUNTED VALUES[1] | ADDRESS[2] | COUNTED VALUES[2] | ADDRESS[3] | COUNTED VALUES[3] |
|---|---|---|---|---|---|---|
| URL1 and URL2 | URL4 | 1 | FILE1 | 1 | FILE2 | 1 |
| URL1 → URL2 | FILE1 | 1 | | 1 | | |
| URL1 or URL2 | FILE1 | 2 | URL4 | | FILE2 | 1 |

T5

INFORMATION PROCESSING SYSTEM, APPARATUS, METHOD, AND RECORDING MEDIUM OF PROGRAM

CROSS-REFERENCE TO RELATED APPLICATIONS

This application is based upon and claims the benefit of priority of the prior Japanese Patent Application No. 2010-64084, filed on Mar. 19, 2010, the entire contents of which are incorporated herein by reference.

FIELD

The embodiment discussed herein is related to an information processing technology for providing information in response to access processing.

BACKGROUND

When a user operates a computer to access a server and a database in the local network or external network, the user collects information using the computer.

For example, Japanese Patent Application Laid-open Publication No. 2009-80598 discusses a technique for providing, when two or more information sources accessed on a same user basis or same section basis are associated the two or more accessed information sources with each other without regard to a target of work and one of the associated information sources is requested, another information source associated with the requested information source or a way of access to another information source is provided.

However, in the technique discussed in Japanese Patent Application Laid-open Publication No. 2009-80598, targets of works of which associated information sources are accessed may not be same when a same user handles different works even in a same session in order to associate with the information sources accessed on the same user basis or the same session basis each other. In this case, when one of the associated information sources is requested, the providing information source may be an information source where a target of the work is not same as the target of the work in the requested information source.

SUMMARY

According to an aspect of the invention, an apparatus includes an obtaining unit to obtain a plurality of addresses in order; a storage unit to store a first group of addresses included in the plurality of addresses and obtained before a certain address is obtained by the obtaining unit, and store a second group of addresses included in the plurality of addresses and obtained after the certain address is obtained by the obtaining unit; and a extracting unit to extract one or more addresses from the first group of addresses when the obtaining unit further obtains an address that matches any address of the first group of addresses, or extract one or more addresses of the second group of addresses when the obtaining unit further obtains an address that matches any address of the second group of addresses, wherein the one or more extracted addresses are other than the matched address.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a format example of data stored in a storage unit 15;
FIG. 11 illustrates an example of data format stored in the storage unit 15;
FIG. 20 illustrates an example of data format stored in the storage unit 21;
FIG. 21 illustrates an example of the data format stored in the storage unit 21;
FIG. 22 illustrates an example of addresses extracted based on two or more addresses;
FIG. 24 illustrates an example of a configuration of a terminal device 1a.

DETAILED DESCRIPTION OF EMBODIMENT(S)

In a work where a user operates a computer to collect information, the user may set a target of the work. The user operates the computer to collect information based on the target, so that information sources that are accessed based on the operation performed to the same target are related to the same target of the work for accessing information sources.

For example, in an operation where a user obtains information regarding a certain target, when the user directly specifies an access destination, the user may identify the obtained information as information corresponding to the certain target of the work, so that the obtained information may relate to the certain target of the work.

In addition, when a user obtains information using a search engine, the user sets a keyword, etc., based on a target of a work and obtains an access destination of information including the keyword from the search engine, so that the information obtained by the access to the access destination may relate to the target of the work.

An embodiment is described below with reference to drawings.

Figure 1:
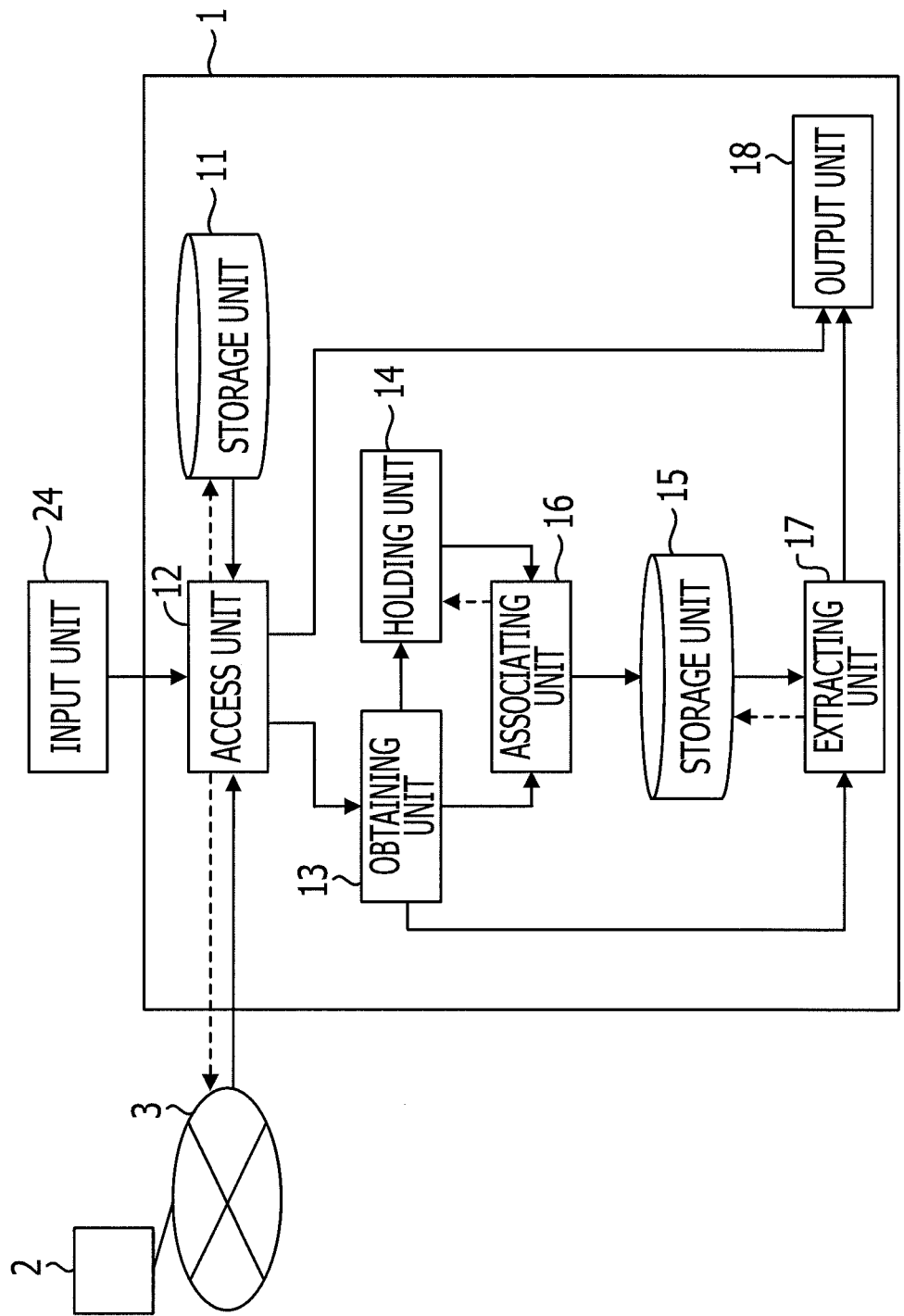
FIG. 1 illustrates a configuration according an embodiment.

FIG. 1 illustrates a configuration of a system 1 according to an embodiment. The system 1 includes storage units 11 and 15, an access unit 12, an obtaining unit 13, a holding unit 14, an associating unit 16, an extracting unit 17, an output unit 18, and an input unit 24. The system 1 may be communicated with another system 2 through a network 3.

The storage unit 11 stores records of works performed, for example by a user, using a terminal device included in the system 1 in charge of incidents processing with respect to each work matter. Information related to the works may be stored other than the records of the works.

The record of the work stored in the storage unit 11 may includes identification information, information indicating a target of the work, information indicating work history, information indicating a work result, information indicating whether or not the work has been finished, etc., with respect to each of the work matter. In addition, the information stored in the storage unit 11 may be created, referred, and edited by access processing of the access unit 12.

The access unit 12 includes a communication function, accesses a device in the local system or another system by an instruction issued from the input unit 24, and obtains information. The flow of control information is illustrated by dotted line and the flow of data is illustrated by solid line in the access unit 12 of FIG. 1.

In addition, the storage unit 11 may be included in an external system other than the system 1 and configured to be accessed by the access unit 12 through the network although not illustrated herein.

The obtaining unit 13 obtains information indicating the access destination by the access processing of the access unit 12 (hereinafter, simply referred to as "address"). The address indicates an area storing information. For example, when information is obtained from a web page, the address may correspond to information such as URL, and when information is obtained from a file, etc., stored in a database, the address may correspond to a path to the file.

The holding unit 14 holds identification information uniquely provided to a plurality of certain addresses (hereinafter, referred to as "group of certain addresses"), respectively. When the address obtained by the obtaining unit 13 is included in the group of certain addresses, the holding unit 14 updates the held identification information to the obtained address as updated held identification information. When the address obtained by the obtaining unit 13 is not included in the group of certain addresses, the holding unit 14 keeps holding identification information that has already been stored at that time.

For example, the "group of certain addresses" may be addresses that indicate a space storing records with respect to each work matter and is stored in the storage unit 11. In this case, when an address included in the group of certain addresses is accessed, the record of a work matter stored in the address may be referred. A record of a work matter stored in each of the addresses may be identified by the identification information given to each address included in the group of certain addresses.

The obtaining of identification information may be performed by, for example, previously giving identification information to an address included in the group of certain addresses and extracting the identification information from an address obtained by the obtaining unit 13. Identification information may be given to an address when it is decided that the tail of the address indicates the identification information.

The storage unit 15 includes a function that stores information such as addresses and identification information.

The associating unit 16 associates an address obtained by the obtaining unit 13 with identification information held in the holding unit 14 and causes the storage unit 15 to store the associated address and identification information. The flow of control information is illustrated by dotted line and the flow of data is illustrated by solid line in the associating unit 16 of FIG. 1.

The extracting unit 17 extracts addresses from the storage unit 15 depending on an address obtained by the obtaining unit 13. For example, the extracting unit 17 extracts addresses associated with same identification information from the storage unit 15 with respect to an address stored in the storage unit 15 which is the same as the address obtained by the obtaining unit 13.

In addition, in processing of the associating unit 16 and the extracting unit 17, when the associating unit 16 causes the storage unit 15 to store an address, identification information held in the holding unit 14 may be referred and processing may be performed that associates the group of addresses associated with each other using the identification information with an obtained address and causes the storage unit 15 to store the associated group of addresses and obtained address. After that, the extracting unit 17 may extract other addresses associated with the address obtained by the obtaining unit 13 and stored in the storage unit 15.

The output unit 18 outputs the information obtained by the access processing of the access unit 12 and the addresses extracted in the extracting unit 17. The output processing may include processing of displaying the information and addresses on a screen such as a monitor, processing of printing the information and addresses by a printer, etc., and processing of outputting the information and addresses as sound information, or the like.

The input unit 24 conveys an instruction inputted by an operator to the access unit 12. The operator may input the instruction by using an input device such as a keyboard, a mouse, and a touch panel which are coupled to the system 1.

Figure 2:
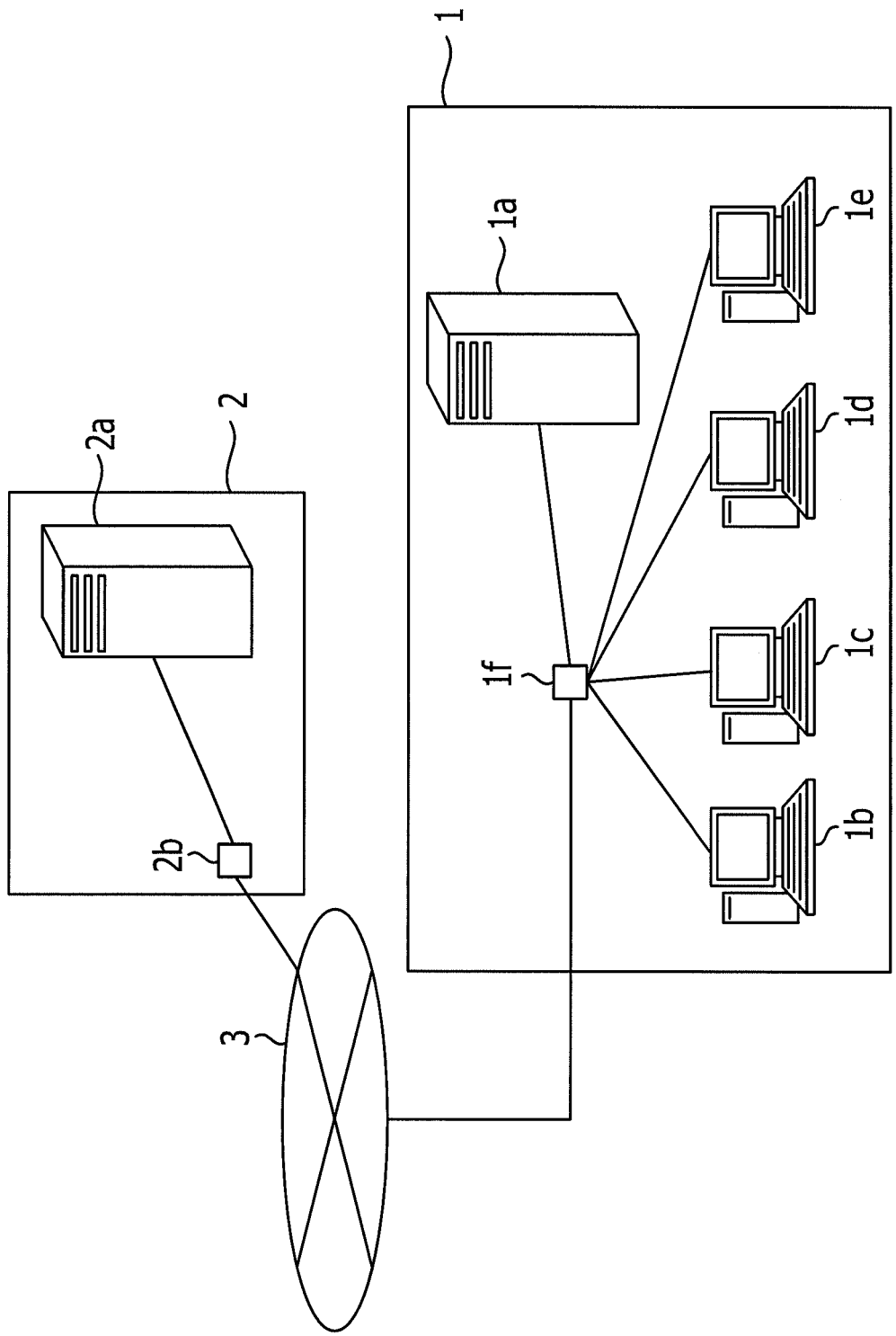
FIG. 2 illustrates an example of a configuration in a system 1.

The system 1 may be made up of a group of devices as illustrated in FIG. 2. The location is a mere example and the system 1 may not be limited to the location as long as the similar function to the location is obtained. In FIG. 2, in addition to the system 1, the network 3 coupled to the system 1 and the system 2 that may communicate with the system 1 through the network 3 are illustrated.

The system 1 may also includes, for example, a storage device 1a, terminal devices 1b to 1e, a relay device 1f. The storage device 1a and the terminal devices 1b to 1e may communicate with each other through the relay device 1f or communicate with another system such as the system 2.

The storage device 1a may include a database storing the records of works managed with respect to each of the work matter and addresses of access destinations in the access processing performed in the terminal devices 1b to 1e.

The terminal devices 1b to 1e are terminal devices that perform processing in response to an operation by an operator. For example, the terminal devices 1b to 1e access another system through the storage device 1a or the network 3 and obtain information in response to an input from the operator. The terminal devices 1b to 1e are mere examples and the system 1 may not be limited to the number of terminal devices described herein.

The relay device 1f may be a device that relays communications between devices coupled to the relay device 1f.

When the system 1 illustrated in FIG. 1 is configured by the group of devices illustrated in FIG. 2, for example, the processing of the storage units 11 and 15 illustrated in FIG. 1 may be alternatively performed by the storage device 1a. In addition, the processing of the access unit 12, the obtaining unit 13, the holding unit 14, the associating unit 16, the extracting unit 17, the output unit 18, and the input unit 24 may be alternatively performed by any one of the terminal devices 1b to 1e. Moreover, each of the terminal devices 1b to 1e may include a storage medium, and a single device may alternatively perform the processing of the system 1 illustrated in FIG. 1.

The system 2 may be configured in various ways. For example, the system 2 may include a server 2a and a relay device 2b. Alternatively, the system 2 may employ a storage device or combination of a server and a storage device instead of the server 2a.

Figure 23:
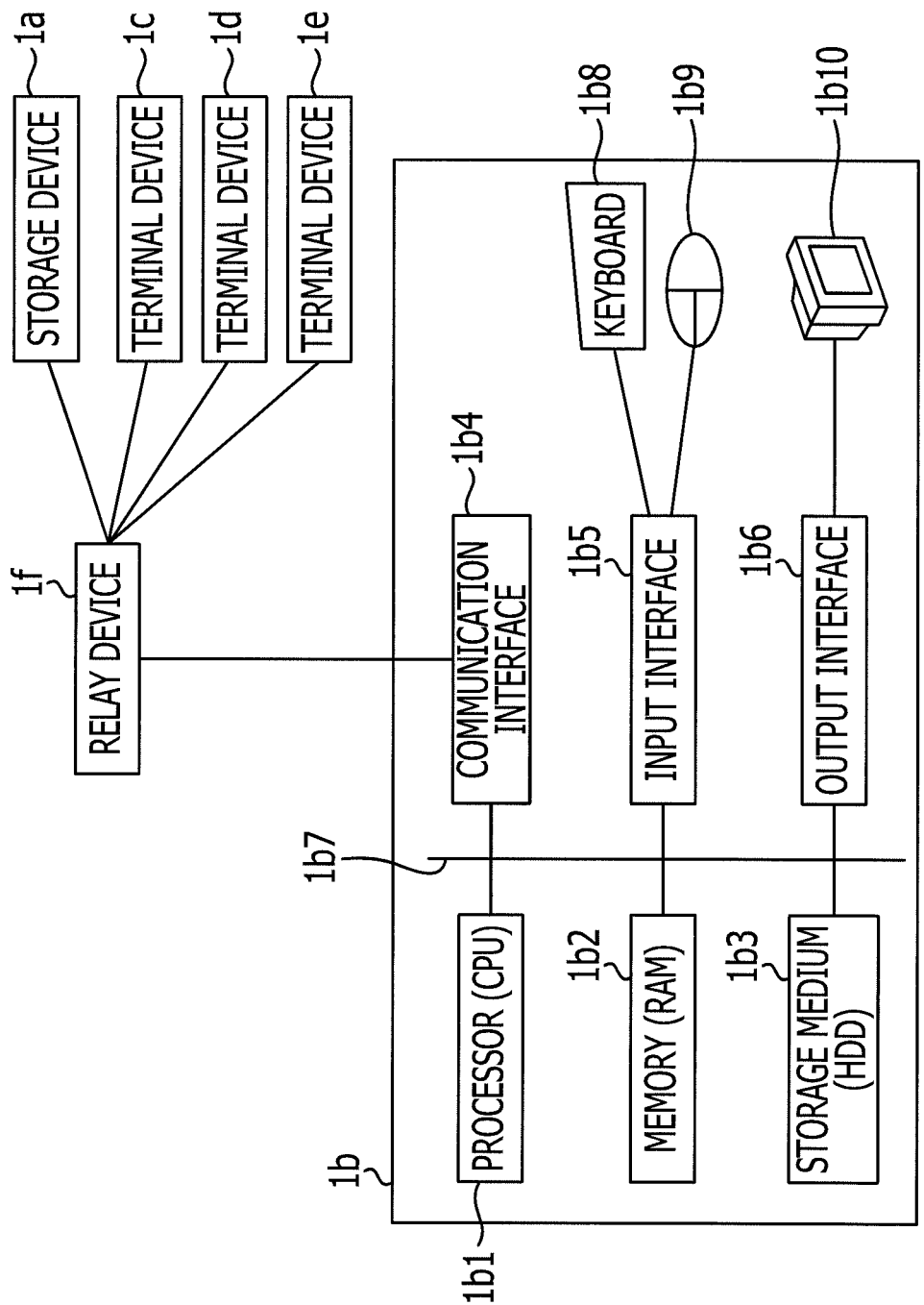
FIG. 23 illustrates an example of a configuration of a terminal device 1b.

FIG. 23 illustrates an example of a configuration of the terminal device 1b included in the system 1. The terminal device 1b includes a processor 1b1, a memory 1b2, a storage medium 1b3, a communication interface 1b4, an input interface 1b5, and an output interface 1b6 which are coupled to each other through a bus 1b7. The configuration of the other terminal devices 1c to 1e may be similar to the configuration of the terminal device 1b.

The processor 1b1 may be, for example, a Central Processing Unit (CPU) and control the entire terminal device 1b. The memory 1b2 may be, for example, a Random Access Memory (RAM), temporarily store a program of an Operating System (OS) and a part of an application program, and store data required for the processing of the processor 1b1. The storage medium 1b3 may be, for example, a Hard Disc Drive (HDD) and store an OS and an application program.

The communication interface 1b4 sends and receives data to and from another device through the network. The input interface 1b5 receives an input signal from an input device coupled to the input interface 1b5 and sends the signal to the processor 1b1. As illustrated in FIG. 23, a keyboard 1b8 and a mouse 1b9 may be coupled to the input interface 1b5 as the input device. Alternatively, a touch panel may (not illustrated) be employed as the input device. The output interface 1b6 performs control of an output processing based on instructions from the processor 1b1. A monitor 1b10 is illustrated as an output device in FIG. 23, however, alternatively, a printer and other various types of output configurations may be employed as the output device.

Figure 24:
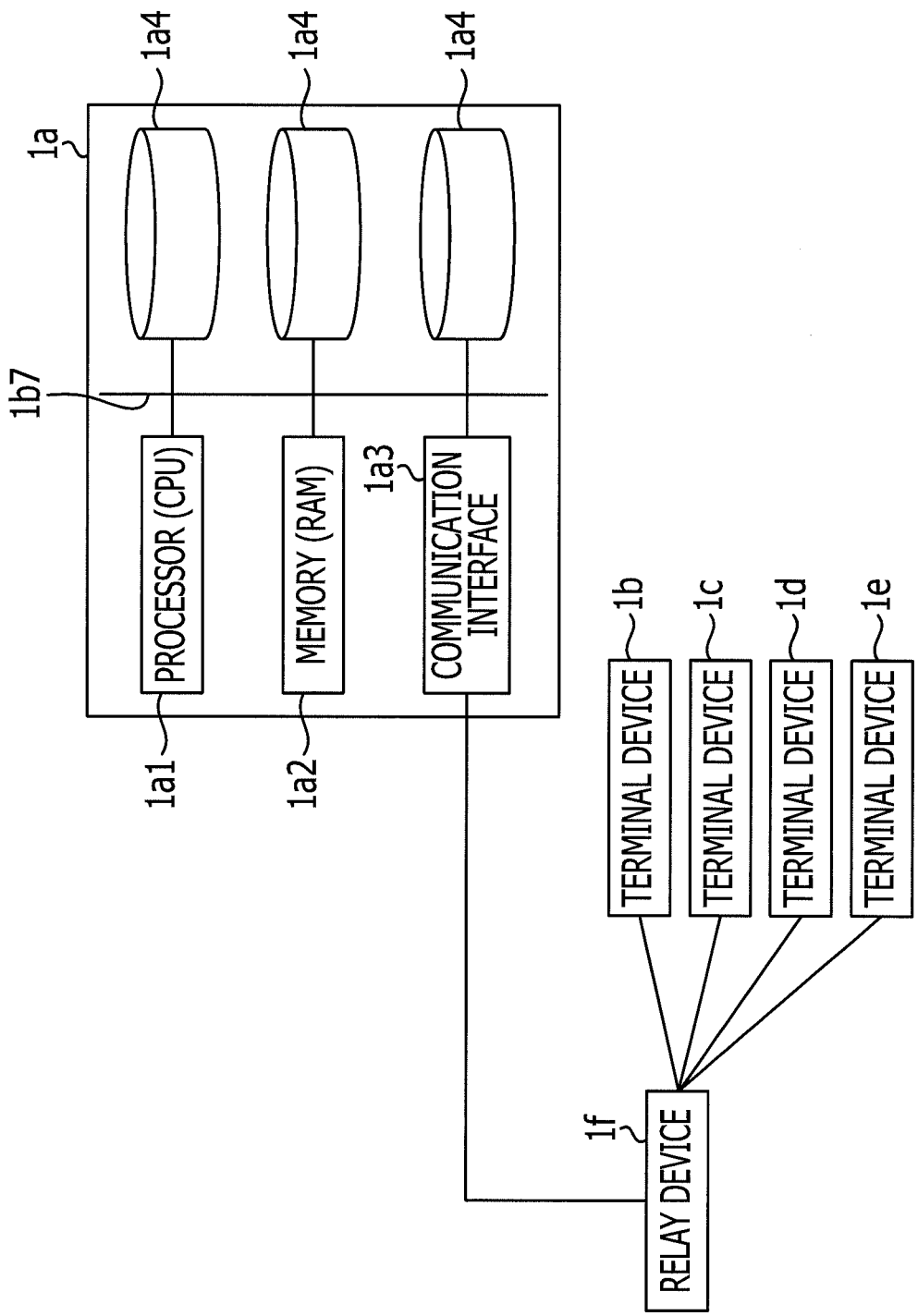

FIG. 24 illustrates an example of a configuration of the storage device 1a. The storage device 1a includes a processor 1a1, a memory 1a2, a communication interface 1a3, and storage mediums 1a4 which are coupled to each other through a bus 1a5.

The processor 1a1 may be, for example, a CPU and control the entire storage device 1a. The memory 1a2 may be, for example, a RAM, temporarily store a program of an Operating System (OS) and a part of an application program, and store data required for the processing of the processor 1a1. The communication interface 1a3 sends and receives data to and from another device through the network. The storage device 1a4 may store an OS and an application program of the storage device 1a and may further store records with respect to each of the work matter performed in the terminal devices 1b to 1e and addresses for the access processing performed in the terminal devices 1b to 1e.

The processing in each of the units in the system 1 in FIG. 1 may be alternatively performed by the hardware in FIGS. 23 and 24. The processing of the storage unit 11 may be alternatively performed, for example, by storing information in the storage medium 1b3 or 1a4. The processing of the access unit 12 may be alternatively performed, for example, by control of the communication interface 1b4 by the processor 1b1. The processing of the obtaining unit 13 may be alternatively performed, for example, by storing of information in the memory 1b2 by the processor 1b1. The processing of the holding unit 14 may be alternatively performed, for example, by reading of information from the memory 1b2 and storing of the information in the memory 1b2 by the processor 1b1. In other words, the holding unit 14 may be implemented in any computer readable recording media. The processing of the storage unit 15 may be alternatively performed, for example, by storing of information in the storage medium 1b3 or 1a4. The processing of the associating unit 16 may be alternatively performed, for example, by reading of information from the memory 1b2 and storing of the information in the storage medium 1b3 or 1a4 by the processor 1b1. The processing of the extracting unit 17 may be alternatively performed, for example, by reading of information from the storage medium 1b3 or 1a4 by the processor 1b1. The processing of the output unit 18 may be alternatively performed, for example, by control of the output interface 1b6 by the processor 1b1. The processing of the input unit 24 may be alternatively performed, for example, by sending of an input signal which the input interface 1b5 receives from the input device, to the processor 1b1.

When the similar function to the storage units 11 and 15 is obtained by the storage medium 1b3, the functions of the system 1 illustrated in FIG. 1 may be obtained by a single device.

Figure 3:
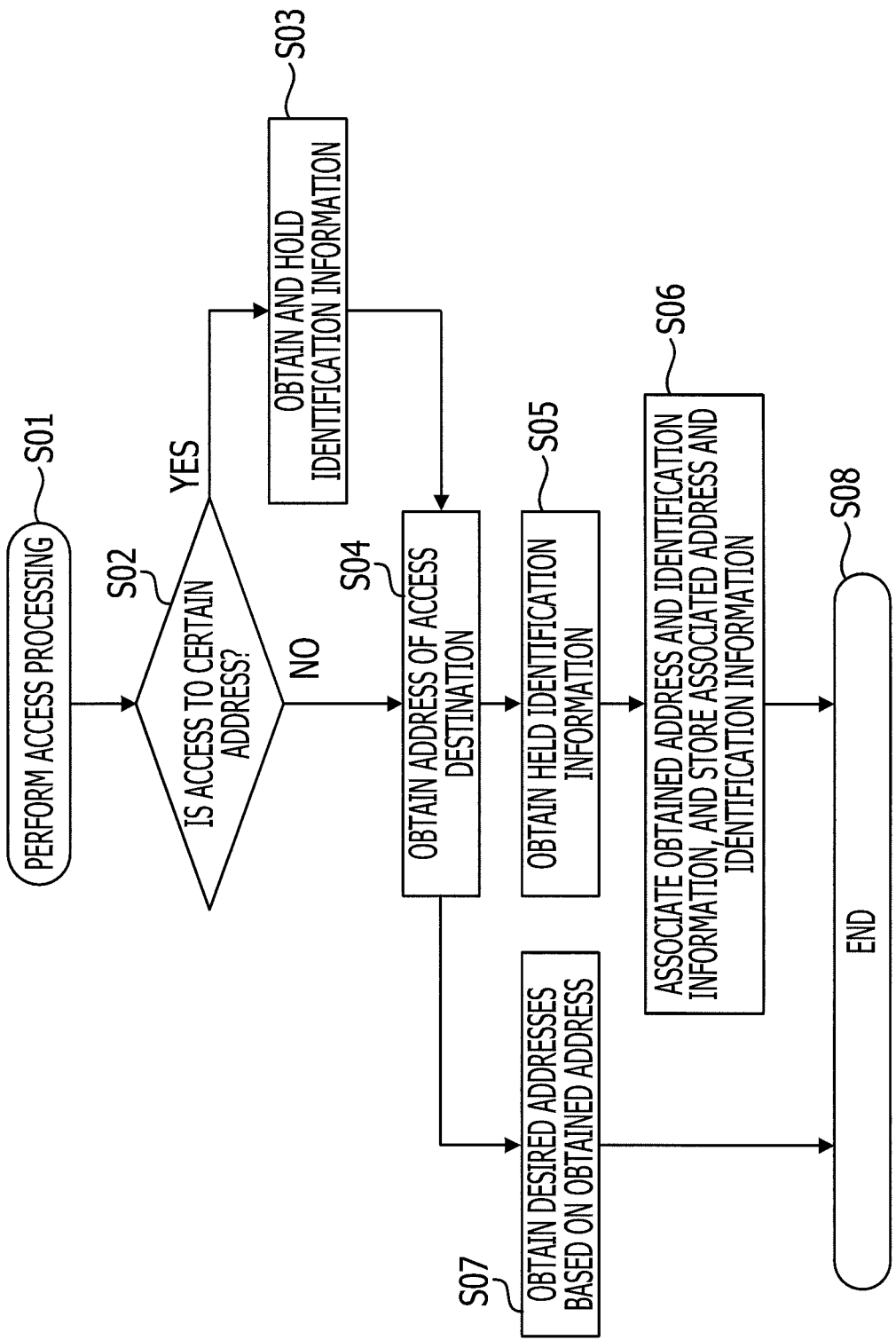
FIG. 3 illustrates a flow of processing according to the embodiment.

A flow of extraction processing of information provided in response to access is described with reference to FIG. 3.

The access unit 21 performs access processing to a specified access destination (S01) and the flow is started by obtaining information of the access destination. It is determined whether the access performed in S01 is access to any one of addresses in a group of certain addresses (S02). When the access is access to any one of addresses in the group of certain addresses, the flow proceeds to S03, and when the access is access to an address that is not included in the group of certain addresses, the flow proceeds to S04.

In S03, identification information of the accessed certain address is obtained, previously held identification information is updated to the obtained identification information for the accessed certain address, and the flow proceeds to S04.

In S04, the address accessed by the access unit 12 is obtained and the flow proceeds to S05 and S07. In S05, held identification information is obtained with reference to the holding unit 14 and the flow proceeds to S06. In S06, the address obtained in S04 and the identification information obtained in S05 are associated and the associated address and identification information are stored in the storage unit 15.

In S07, addresses associated with same identification information as an address indicating a same access destination as the address earlier or previously obtained in S04 are extracted from the storage unit 15, so that the flow of the extraction processing of the information provided in response to access ends (S08).

Association of access information with identification information is described with reference to FIGS. 4 and 5.

Figure 4:
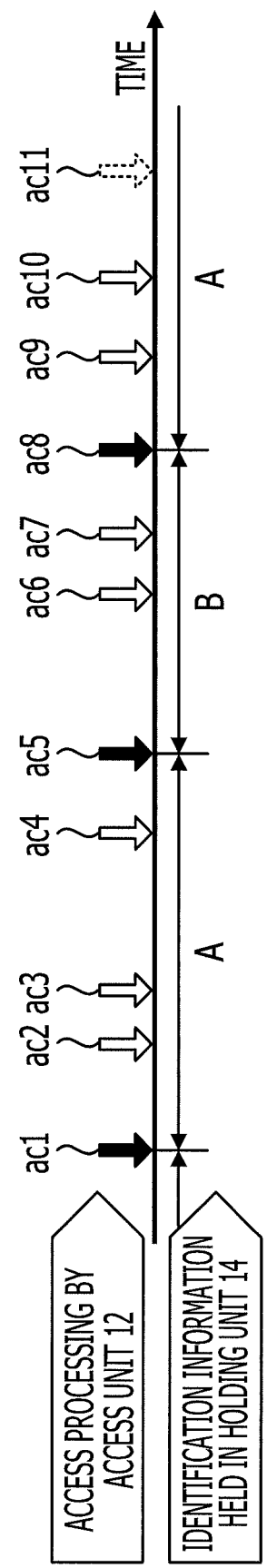
FIG. 4 illustrates association of access processing with held identification information in a time sequence.

FIG. 4 illustrates an example of access performed by the access unit 12 in a time sequence and the timings when the access performs are illustrated by arrows "ad" to "ac10". In this case, access to an address included in the group of certain address may be performed three times, the access may be "ad", "ac5", and "ac8" illustrated in FIG. 4. An address "URL1" accessed at the timing of "ad" may be provided with identification information "A", an address "URL5" accessed at the timing of "ac5" may be provided with identification information "B". The address "URL1" may be accessed at the timing of "ac8" in addition to "ad".

In the access "ad" to "ac10" illustrated in FIG. 4, identification information held in the holding unit 14 is switched at the timing of "ad", "ac5", and "ac8". The holding unit 14 holds the identification information "A" during from "ad" to "ac5", holds the identification information "B" during from "ac5" to "ac8", and holds the identification information "A" during from "ac8" to "ac10".

In FIG. 5, information stored in the storage unit 15 corresponding to the access "ad" to "ac10" of FIG. 4 are illustrated. For each of the access "ad" to "ac10", an accessed address and identification information held in the holding unit 14 are stored in the storage unit 15. In the example of FIG. 5, addresses accessed at the timing of "ac1" to "ac4" and addresses accessed at the timing of "ac8" to "ac10" are associated with the identification information "A" and the associated addresses and identification information are stored in the storage unit 15. In addition, addresses accessed at the timing of "ac5" to "ac7" are associated with the identification information "B" and the associated addresses and identification information are stored in the storage unit 15.

The extracting unit 17 extracts addresses associated with same identification information as an address obtained earlier by the obtaining unit 13. Thus, for example, when "ac11" (not illustrated) is access to the same address "URL6" to "ac6" (illustrated by dotted line in FIG. 5), the addresses "URL5" and "URL7" that are associated with the same identification information as the address "URL6" may be extracted in response to the access "ac11".

In the system 1 according to the embodiment, addresses for the access processing performed by the access unit 12 during from access to any one of addresses in the group of certain addresses to next access to any one of addresses in the group of certain addresses are associated with same identification information and the associated addresses and same identification information are stored in the storage unit 15. The switching of identification information is caused by a certain address, so that even the addresses that are not a continuous in time access, such as "ac1" to "ac4" and "ac8" to "ac10" illustrated in FIG. 4 may be associated with same identification information.

In addition, when the group of certain addresses is addresses of storage destinations of records with respect to each work matter and then access to any one of addresses in the group of certain addresses is performed, an operator may confirm summary, progress, and state of a work. The operation desired for the work when the operator directs the access unit 12 to access the address, i.e., the confirmation of record by the operator may cause identification information held in the holding unit 14 to switch.

The confirmation of records may be performed at the start of a work related to the record or during the work, so that each information obtained during from access to next access for confirming the record is regarded as information obtained in a same work. As a result, the addresses associated with same identification information are common in that the addresses store information collected in the same work.

In an address extraction process, when an operator directs the access unit 12 to an address included in a group of addresses which are associated with each other, addresses other than the accessed address are extracted out of the group of addresses. As a result, related information such as an address obtained in a same previous work may be provided in response to the access.

In this case, when an address of related information is provided, an operator may collect information based on the target of a work without operations such as resetting of an keyword, re-searching of information, selecting of a way of access such as a link obtained by the searching.

Figure 6:
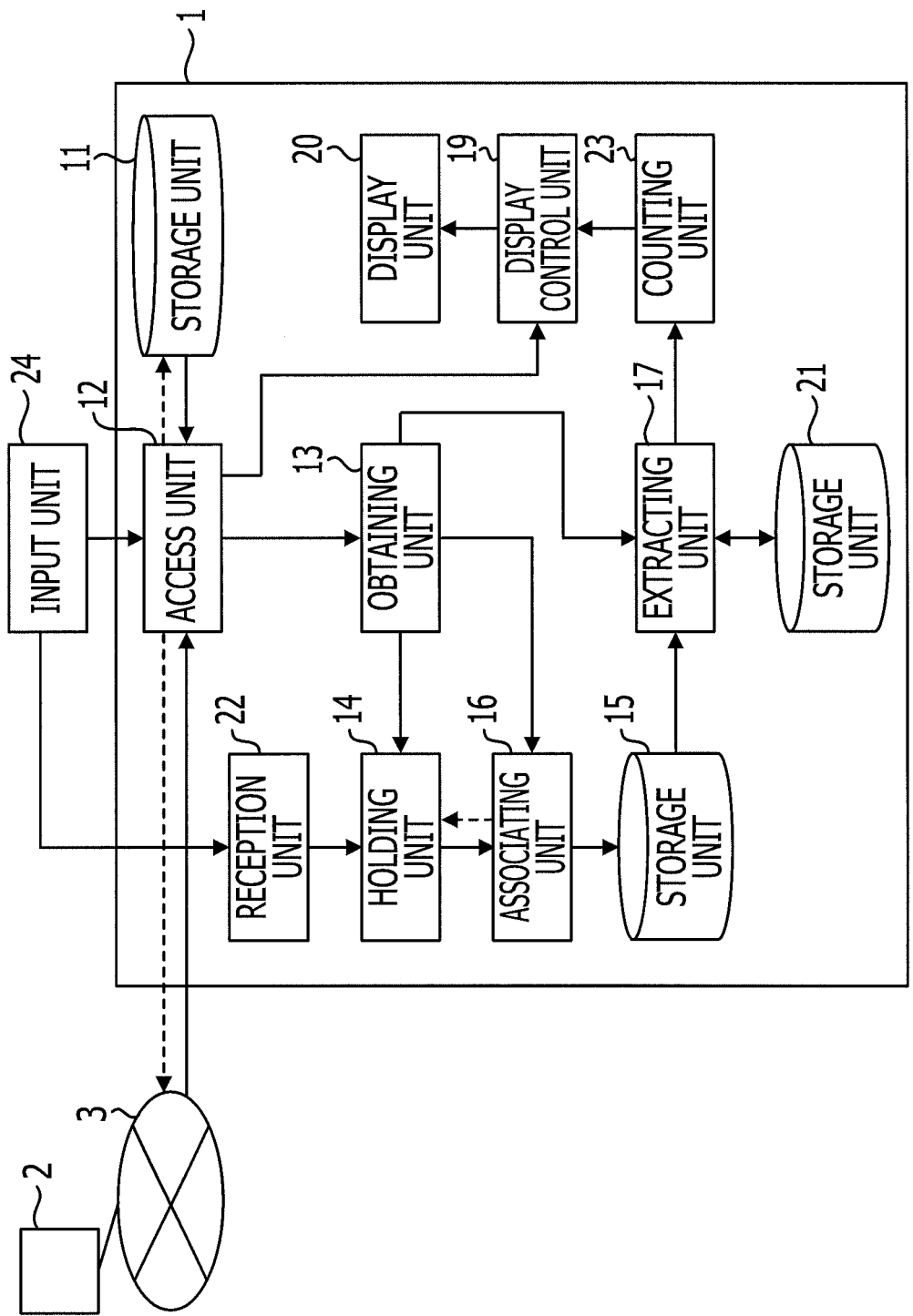
FIG. 6 illustrates an example of a configuration including a counting unit 23 and a storage unit 21 according to the embodiment.

The system 1 illustrated in FIG. 1 further includes any of a display control unit 19, a display unit 20, a storage unit 21, a reception unit 22, and a counting unit 23, or includes the combinations among the display control unit 19, the display unit 20, the storage unit 21, the reception unit 22, and the counting unit 23. The above-described configuration in the system 1 is illustrated in FIG. 6.

The display control unit 19 controls the display unit 20 to display addresses extracted in the extracting unit 17 or count results in the counting unit 23. The extracted addresses may be displayed as a link on a screen.

The display unit 20 performs display based on the control by the display control unit 19.

The storage unit 21 associates, with respect to an address stored in the storage unit 15, the addresses stored in the storage unit 15 with an address that is associated with same identification information as the address stored in the storage unit 15, and stores the associated addresses. The storage unit 21 may associates, with respect to an address, count results in the counting unit 23 (described later) with the address stored in the storage unit 15 and store the associated count results and the address. The associating and storing processing (hereinafter, referred to as learning processing), for example, may be performed each time the extraction processing is performed in the extracting unit 17 or each time the counting processing is performed in the counting unit 23. In addition, the learning processing may be performed once a day and then stored learning information may be updated.

Information stored in the storage unit 21 is read by the extracting unit 17. The extracting unit 17 extracts the information associated with the address obtained by the obtaining unit 13.

In addition, in the processing of the extracting unit 17 when the storage unit 21 is provided in the system 1, extraction processing may be merely performed to the storage unit 21. Alternatively, the extraction processing is performed to the storage unit 21 and when an address obtained by the obtaining unit 13 is not stored in the storage unit 21, extraction processing may be performed to the storage unit 15.

When the reception unit 22 receives an input of identification information from the input unit 24, the reception unit 22 updates identification information held by the holding unit 14 to the received identification information. As a result, information held by the holding unit 14 may be changed by an input from an operator.

The counting unit 23 performs the processing for counting the number of same addresses extracted by the extraction unit 17. As a result, an address that is large in number may be selected. Alternatively, the counted addresses may be arranged in descending order of the number.

The processing of the display control unit 19, the display unit 20, the storage unit 21, the reception unit 22, and the counting unit 23 may be alternatively performed by the hardware illustrated in FIGS. 23, 24. The processing of the display control unit 19 may be alternatively performed, for example, by control of the output interface 1*b*6 by the processor 1*b*1. The processing of the display unit 20 may be alternatively performed, for example, by displaying on the display device such as the monitor 1*b*10 based on the output interface 1*b*6. The processing of the storage unit 21 may be alternatively performed, for example, by reading of information from the storage medium 1*b*3 or 1*a*4 by the processor 1*b*1 or 1*a*1, temporarily storing of the information in the memory, and storing of the temporarily stored information in the storage medium 1*b*3 or 1*a*4. The processing of the reception unit 22 may be alternatively performed, for example, by sending of an input signal from the input device such as the keyboard 1*b*8 and the mouse 1*b*9, to the processor 1*b*1 by the input interface 1*b*5. The processing of the counting unit 23 may be alternatively performed, for example, by reading of information from the storage medium 1*b*3 or 1*a*4 by the processor 1*b*1 or 1*a*1, temporarily storing of the count information in the memory, and storing of the result of the count information in the storage medium 1*b*3 or 1*a*4.

Application examples according to the embodiment are described below with reference to drawings. The embodiment is not limited to the application examples.

As a first application example, the embodiment may apply to incident handling in the customer support tasks related to products and services. The incident handling is utilized for customer supporting tasks to resolve troubles occurring to the products and services and generally performed in response to inquiries from customers. The inquiries from customers include inquiries about the breakdown and malfunction of products, usage of products, cancel request of services, or the quality of services. The incident handling is also performed in response to inquiries such as an alert from a monitoring tool for a system.

An "incident" is an event which occurs when emergency response is desired because it is or may be difficult for a customer to receive regular service. When the incident is caused by an inquiry from a customer or alert from a monitoring tool and the incident is dealt with, confirmation of the resolution of the inquiry from the customer is obtained, so that the incident is closed. The described-above operations for the inquiry are regarded as the flow of single incident handling.

In incident management, incident handling is recorded and managed. For example, the recorded information includes a symptom and a cause of the incident, response time, characteristic keywords in the symptom of the incident, whether or not the incident is closed, and information uniquely identifying each incident (incident ID), etc. A "symptom" of an incident indicates a state and condition of products and services when the incident occurs. The records of the incident handling are stored in a database. After that the recorded information is utilized as reference when another incident handling is performed and further utilized for the evaluation and improvement of the quality in the incident handling tasks.

Figure 7:
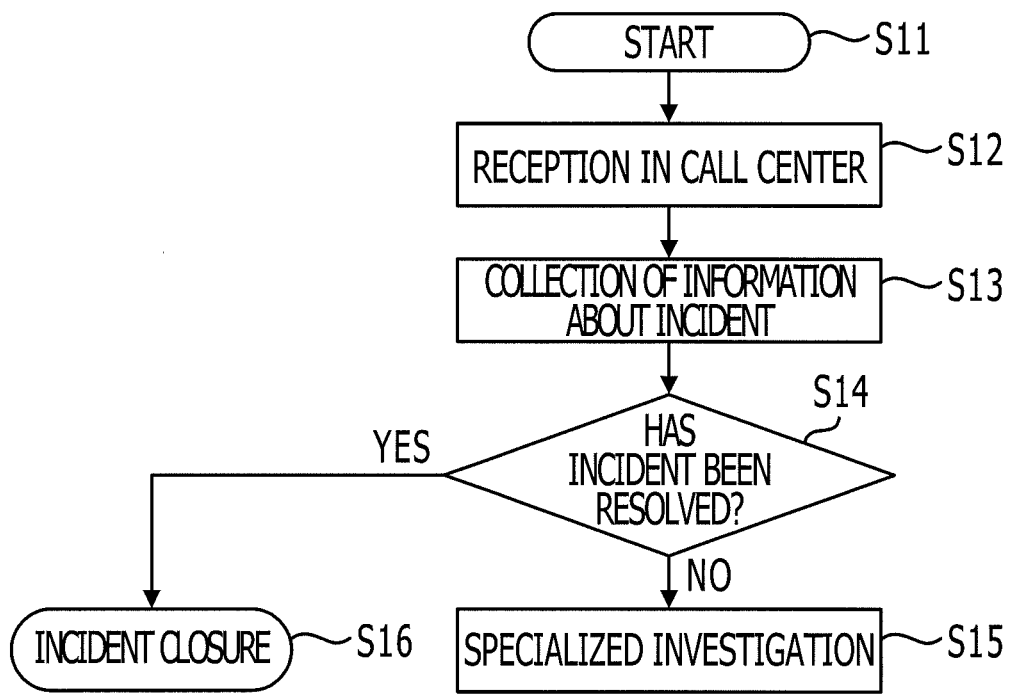
FIG. 7 illustrates a flow of incident handling.

FIG. 7 illustrates a flow of the incident handling. When trouble of a product or a service occurs, the incident handling starts (S11). First, for example, in the call center, an inquiry from a customer is received (S12). After that, information related to an incident is collected to deal with the incident (S13). When the incident is resolved by investigation, the incident is closed (S16) and when the incident is not resolved, for example, specialized investigation for the causes is performed (S15). The ion where the information associated with an incident is collected is described below.

For example, the information related to an incident to be handled may include records of prior incidents, in a prior incidents database, of which symptom and cause, etc., are common, an online instruction manual or associated pages on the web, and a customer information file (for example, network configuration diagram) in an management database. An operator collects information and extracts information that is desirable for use in resolving an incident, from the collected information.

When the operator collects information, the operator is provided with information related to the accessed information or way of access to the related information (for example, a link), improving the collection of information in the work matter.

For example, when the operator is provided with a record where a similar incident has been dealt with previously, the operator may promptly resolve the incident based on the previous measures for dealing with the similar incident. In addition, when the operator is provided with information related to an incident (for example, the online instruction manual and the customer network configuration diagram), the operator may be provided information for resolving the incident.

The investigation of incident handling is performed based on a symptom of an incident to be handled, so that when same information is accessed in two or more incidents, the symptoms or causes of the incidents may be related to each other.

The operator is provided with records of prior incidents which is related to the incident being currently handled and is stored in the prior incidents database, or information accessed in the incident or a way of access to the information (for example, a link), so that the operator may be provided the key to information to be subsequently referred.

The records of incidents stored in the prior incidents database includes the symptoms and causes of the incidents, so that when the operator is provided with a record of an incident related to the incident being currently handled, the operator may find out the cause of the related incident. When incidents stored in the prior incidents database and the incident being currently handled have a cause in common, the operator may promptly resolve the incident without further collection of information.

An address of access destination is associated with an incident ID and stored in a database for storing addresses to provide an operator with information related to an incident being currently handled. As a result, an address related to a last access is extracted from the addresses stored in the database and the operator may be provided with a way of access based on the address.

The information of the stored addresses may be desirable for use in incident management. A process to obtain information leading to resolving of an incident is found out, so that the information of addresses may be utilized for the evaluation and improvement of the quality in the customer supporting tasks and also utilized for confirming whether or not a function for providing information according to the embodiment leads to the resolving of an incident.

An incident where an operator in charge is not limited to a single incident and the operator may be in charge of two or more incidents at the same time. An incident ID associating access information may be switched corresponding to a timing at which the operator switches an incident to be handled in order to associate the address with an incident ID of an incident being currently handled.

Information provision in the incident handling is performed using the system 1 illustrated in FIG. 1 or 6.

For example, the storage unit 11 may be the prior incidents database where the records of prior incidents are stored.

The access unit 12 obtains information from a external system through the management database, a database such as the prior incidents database, or the network 3. The records of prior incident stored in the prior incidents database or a management file including the customer information stored in the management database is obtained from the databases. A web page or a file such as the online instruction manual is obtained from the external system.

The obtaining unit 13 obtains the address of an access destination accessed by the access unit 12. The holding unit 14 obtains and holds an incident ID of a record, when the obtained address is included in addresses of the records of prior incidents in the prior incidents database.

The associating unit 16 associates the obtained address with the held incident ID and causes the storage unit 15 to stores the associated address and incident ID. The extracting unit 17 obtains an address from the storage unit 15 corresponding to the obtained address. In the storage unit 15, the writing and reading of information are performed by the associating unit 16 and the extracting unit 17.

Additionally, the system 1 may include the counting unit 23 that counts addresses extracted by the extracting unit 17 with respect to an address, the display control unit 19 that controls to display an address on a screen, the display unit 20 that performs display based on the control by the display control unit 19, and the storage unit 21 that stores related addresses together with respect to an address.

Figure 8:
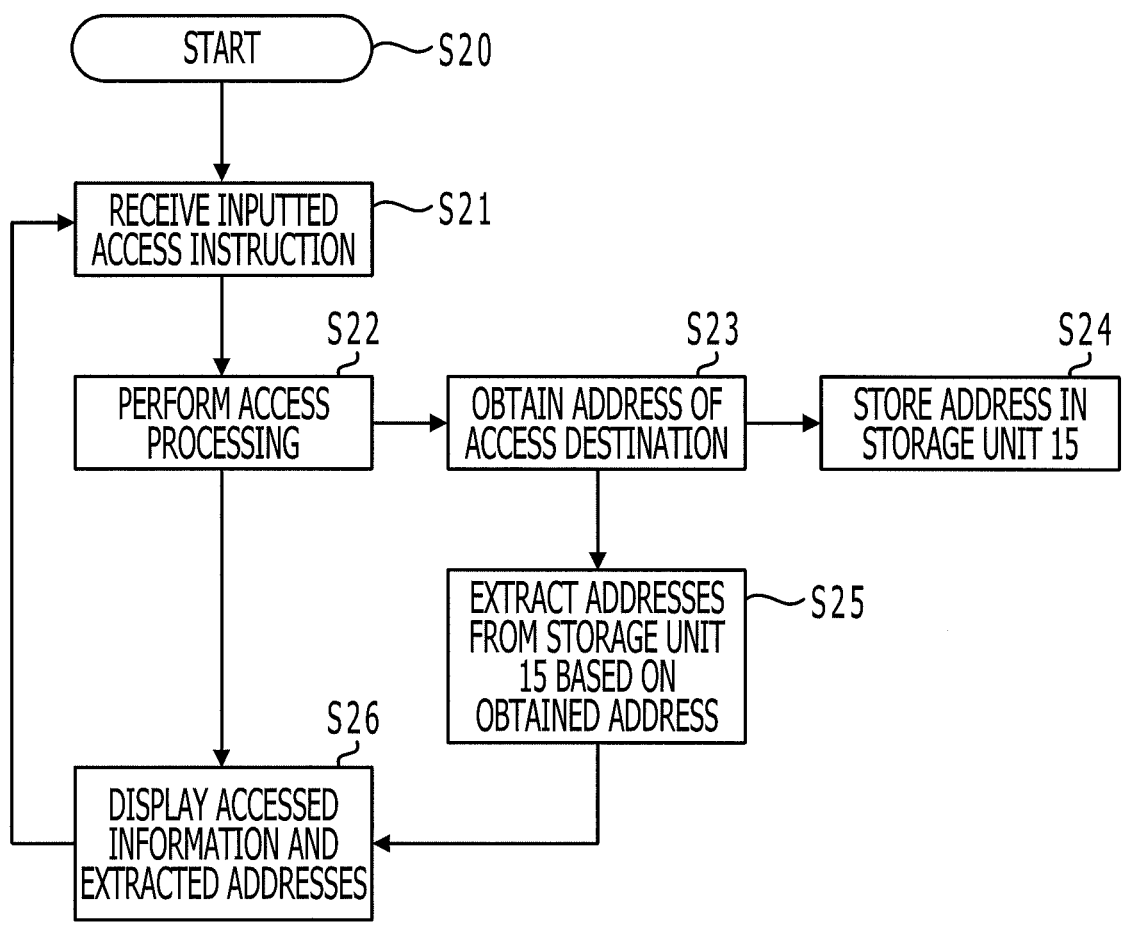
FIG. 8 illustrates a flow of processing for providing related information in response to access.

FIG. 8 illustrates a flow of processing for providing related information corresponding to access by the incident handling system 1. The access unit 12 receives an access instruction inputted by an operator (S21) and performs access processing to a web page or a file based on the received access instruction (S22). The information obtained by the access processing in S22 is outputted to the display unit 20 by the display control unit 19 and displayed by the display unit 20 (S26).

The obtaining unit 13 obtains the address of the access destination in S22 (S23). The obtained address is stored in the storage unit 15 (S24). In addition, addresses related to the obtained address are extracted from the storage unit 15 (S25). The addresses extracted in S25 are outputted to the display control unit 19 and displayed by the display unit 20 together with the information obtained by the access processing in S22 (S26).

Figure 9:
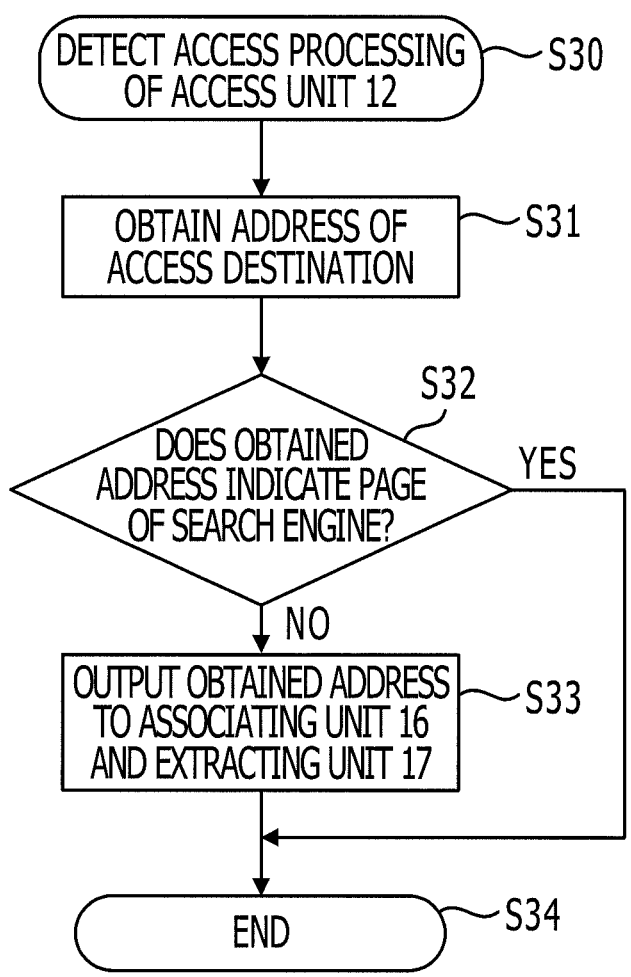
FIG. 9 illustrates a flow of obtaining an address.

FIG. 9 illustrates a flow of obtaining an address (S23). When access processing is performed by the access unit 12 (S30), an address accessed by the access unit 12 is obtained (S31).

After that, it is determined whether or not the obtained address indicates a search page of a search engine (S32), when the obtained address is a search page of a search engine, the processing of obtaining an address ends (S34). When the address is not a search page of a search engine, the obtained address is outputted to the associating unit 16 and the extracting unit 17 (S33). For example, "a search page of a search engine" may be a homepage of the search engine or a page indicating search results from an inputted keyword.

Figure 10:
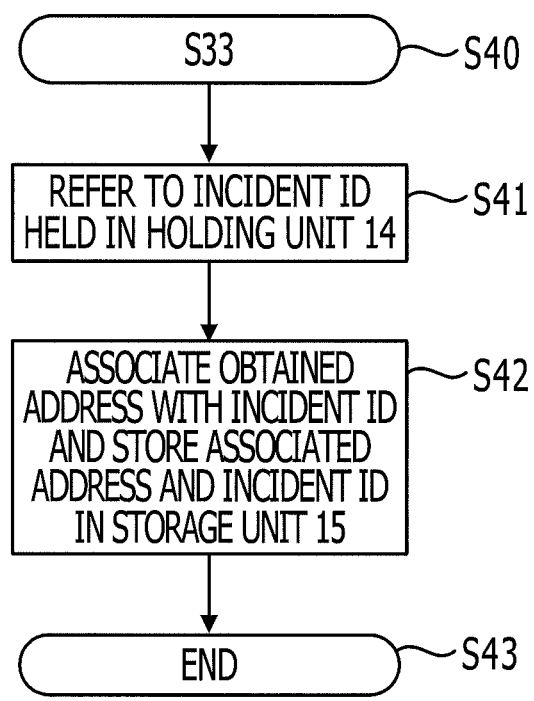
FIG. 10 illustrates a flow of associating an address with an incident ID and storing the associated address and incident ID.

FIG. 10 illustrates a flow of storing an address in the associating unit 16 (S24). The associating unit 16 obtains an address from the obtaining unit 13 (S40) and refers to an incident ID held in the holding unit 14 (S41). After that, the associating unit 16 associates the obtained address with the incident ID referred in S41 and causes the storage unit 15 to store the associated address and incident ID (S42).

Figure 12:
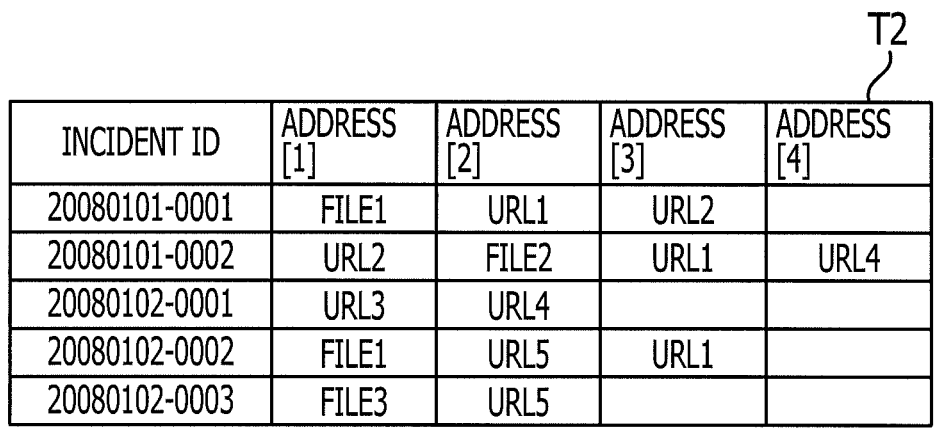
FIG. 12 illustrates an example of the data format stored in the storage unit 15.

For example, the information stored in the storage unit 15 may be stored by associating an incident ID with respect to the obtained address as illustrated by a table T1 in FIG. 11 or stored by associating an address obtained when an incident is being handled with respect to the incident ID as illustrated by a table T2 in FIG. 12. In FIG. 12, addresses [1] to [4] belong to the same row of the table T2 are obtained when the same incident is being handled.

Figure 13:
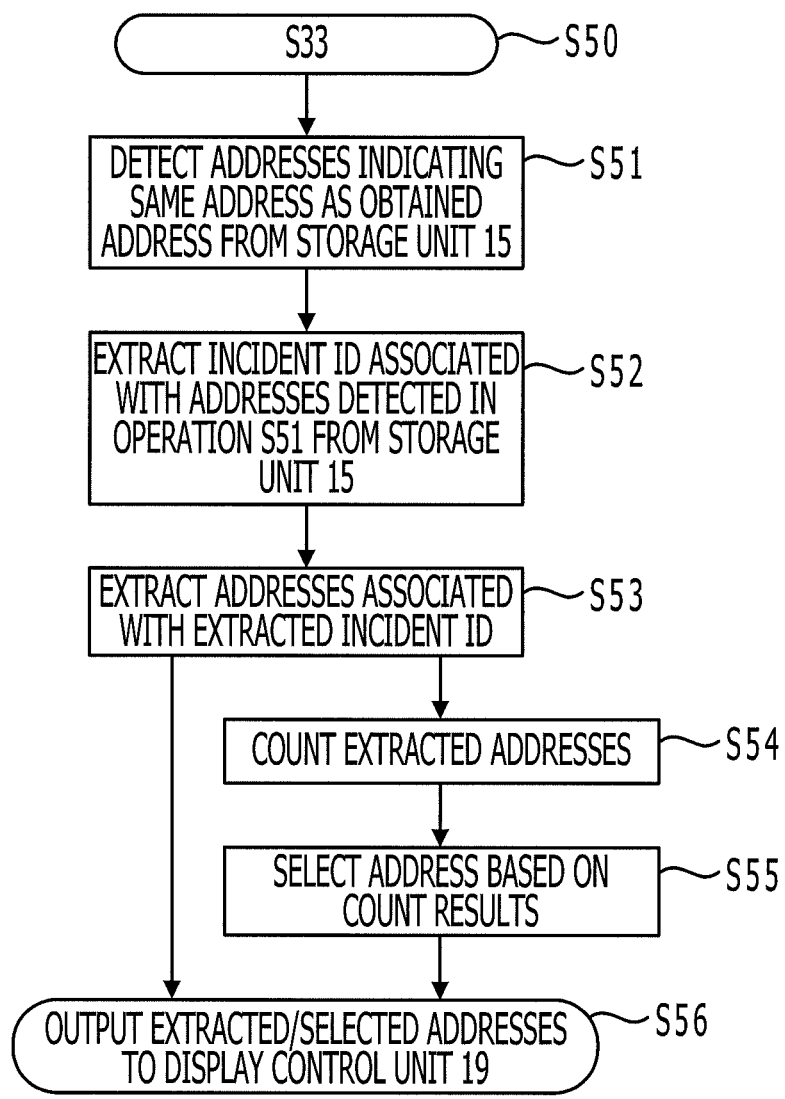
FIG. 13 illustrates a flow of processing for extracting addresses.

FIG. 13 illustrates a flow of the processing in the extracting unit 17 (S25). When the obtaining unit 13 obtains an address (S50), the extracting unit 17 detects addresses indicating a same address as the obtained address from the storage unit 15 (S51).

After that, the extracting unit 17 extracts an incident ID associated with the addresses detected in S51 (S52) and further extracts addresses associated with the extracted incident ID (S53).

The table T1 illustrated in FIG. 11 or the table T2 illustrated in FIG. 12 is stored in the storage unit 15. For example, in S52, when an address "URL1" is obtained, the storage unit 15 extracts incident IDs "20080101-0001", "20080101-0002", and "20080102-0002". In addition, in S53, when the incident ID "20080101-0002" is searched, the storage unit 15 extracts addresses "URL2", "file2", "URL1", and "URL4". In S53, the address obtained by the obtaining unit 13 (that is, "URL1" in the example of the table T2) may be removed.

Figure 14:
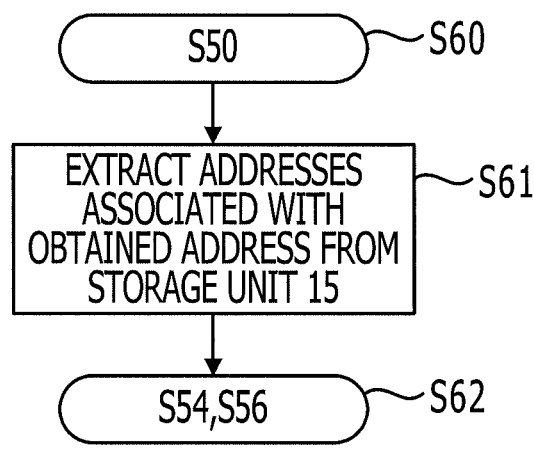
FIG. 14 illustrates a flow of the processing for extracting addresses.

When the addresses are store in the storage unit 15 in the table T2 format of FIG. 12, a flow illustrated in FIG. 14 (S60 to S62) may be employed instead of the flow illustrated in FIG. 13 (S50 to S56). The extracting unit 17 extracts addresses associated with an address which is the same as an address obtained by the obtaining unit 13, from the storage unit 15 (S61). The "associated addresses" are addresses which belong to a same row (a same incident) as the obtained address in the table T2 of FIG. 12.

In such extraction processing, the coverage of search may be limited to an address related to an closed incident. For example, a record including the incident ID of an incident that is not closed may be provided with information that instructs not to extract associated addresses.

For example, in accessed addresses of prior incident handling, when the incident is closed and the incident handling is performed, at least one of the accessed addresses may be desirable for use in determining the cause of the incident. Thus, when extracted addresses are limited to addresses associated with a closed incident ID, the probability of the extracted addresses including information that is desirable for use in dealing with the incident may be increased.

In addition, the incident may be promptly resolved by utilizing the limited address, so that when the same access is performed next time, the probability of the obtained address including information that is desirable for use in resolving the incident may be increased.

Moreover, the extraction processing may be merely performed to an address that is accessed after a detected address in S51 among addresses associated with a same incident ID.

For example, in the table T2 illustrated in FIG. 12, the "URL2" of the "20080101-0001" and "URL4" of the "20080101-0002" are extracted as information related to "URL1" in the incidents "20080101-0001", "20080101-0002", and "20080102-0002" while "URL5" and "file1" of the "20080102-0002" are not extracted.

When a current incident is not resolved in a state where same information in the prior incident as currently-accessed information is accessed, the prior incident may also not be resolved. The probability of the prior incident having been resolved by information accessed after same information as currently-accessed information is accessed may be increased. Thus, the extraction processing is merely performed to an address that is accessed after the detection of an address in S51, the information is desirable for use in resolving the incident may be readily accessible.

In S51 to S53 or S61, the extraction processing is performed by the extracting unit 17, so that addresses extracted from the storage unit 15 are outputted to the counting unit 23 (S54) or the addresses are outputted to the display control unit 19 when the counting unit 23 is not included in the system 1 (S54).

In S54, the addresses extracted in S53 are counted with respect to an access destination, and in S55, an address is selected based on the count results. There may be various types of selection such as selection of an address where the number of counts is greater than a certain number or selection of the certain number of addresses ranked in the high order of the number of counts.

For example, in FIG. 11 or 12, when addresses associated with the incident ID "20081010-0002" are used as an example, the counted values with respect to an address may be "1" in each of the "URL2", "file2", "URL1", and "URL4". When addresses are extracted based on two or more incident IDs in S53, counting processing is performed with respect to the address extracted based on each of the two or more incident IDs. The counted values counted with respect to the address may be utilized as degree of association with a last address obtained by the obtaining unit 13.

In S56, an address is outputted to the display control unit 19.

In the storage unit 15, an address is associated with an incident ID being currently handled and is stored. The incident being currently handled may be identified, for example, by holding the incident ID being currently handled in the holding unit 14 and referring to the holding unit 14 when the incident ID is associated with an address and the address and the incident ID are stored in the storage unit 15. For example, methods for holding an incident being currently handled in the holding unit 14 are may be as follows.

Figure 15:
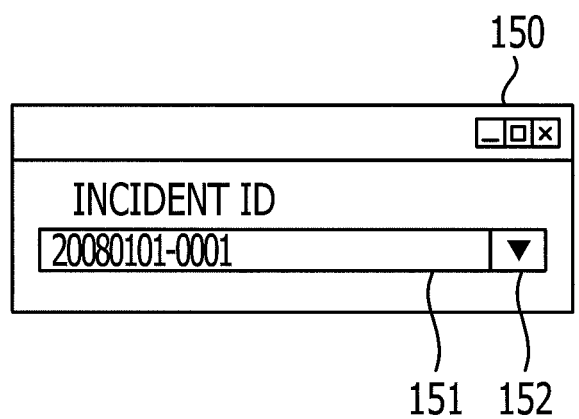
FIG. 15 illustrates an example of an incident ID input screen.

In a first method for holding an incident being currently handled, the display control unit 19 causes an input screen 150 as illustrated in FIG. 15 to be displayed on the display unit 20 and an incident ID may be obtained by inputting the incident ID to an input space 151 of the input screen 150 from an operator when the operator starts incident handling or changes an incident to be handled. When an already held incident ID is updated to the obtained incident ID in the holding unit 14, an address may be associated with the incident ID of the incident being currently handled in the associating unit 16. In addition, the incident ID may be inputted using a pull-down list 152.

When a management system for incident records is used, the operator may access the incident record stored in the management system for incident records to input or browse the incident records. In a second method for holding an incident being currently handled, access the incident record stored in the management system for incident records is detected due to an address obtained by the obtaining unit 13, so that an incident ID held in the holding unit 14 may be updated.

Figure 16:
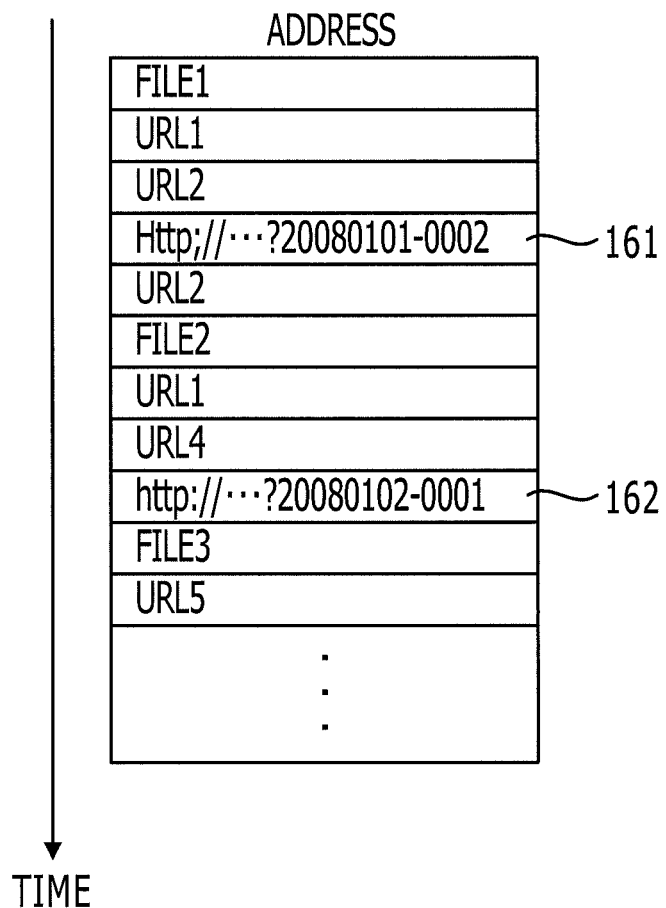
FIG. 16 illustrates an example of addresses obtained by an obtaining unit 13.

FIG. 16 illustrates an example of an address obtained by the obtaining unit 13. When the access unit 12 performs access processing in order illustrated in FIG. 16, the obtaining unit 13 obtains addresses in the order illustrated in FIG. 16. For example, when addresses 161 and 162 of incident records in the management system are obtained, an incident ID in the holding unit 14 may be updated. In addition, when an address includes an incident ID, an incident where the address belongs may be identified desirably.

Figure 17:
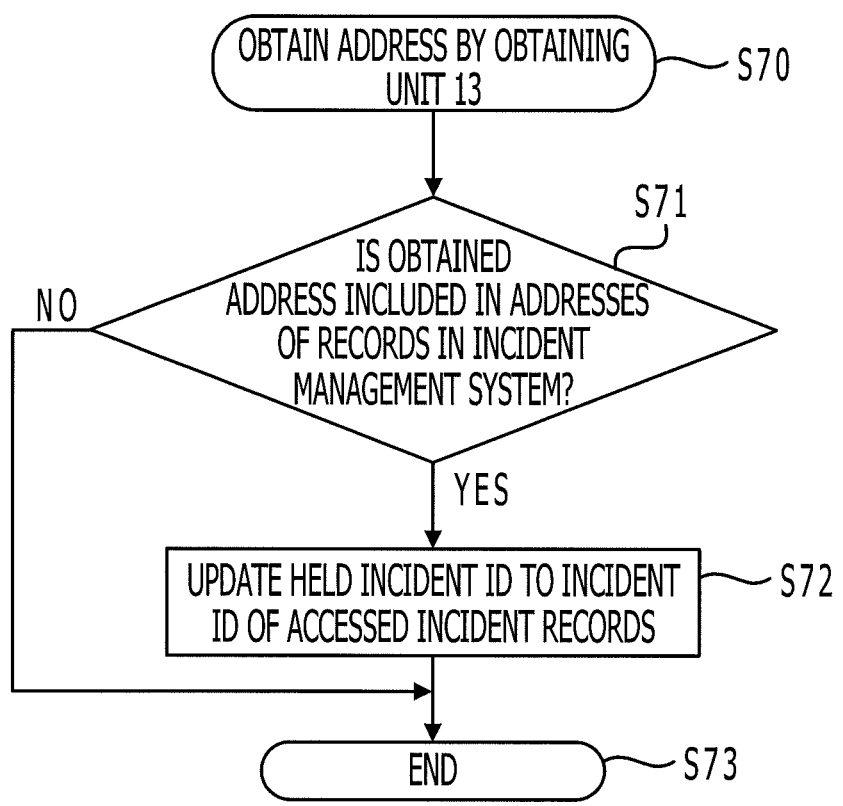
FIG. 17 illustrates a flow of obtaining an incident ID.

The processing where an incident ID is obtained may be performed as a flow illustrated in FIG. 17. When an address is obtained by the obtaining unit 13 (S70), it is determined whether or not the obtained address is included in addresses of incident records in the management system (S71). When the obtained address is included in addresses of incident records in the management system, an incident ID held in the holding unit 14 is updated (S72). When the processing in S72 ends or the obtained address is not included in addresses of incident records in the management system, the processing where an incident ID is obtained ends (S73).

Figure 18:
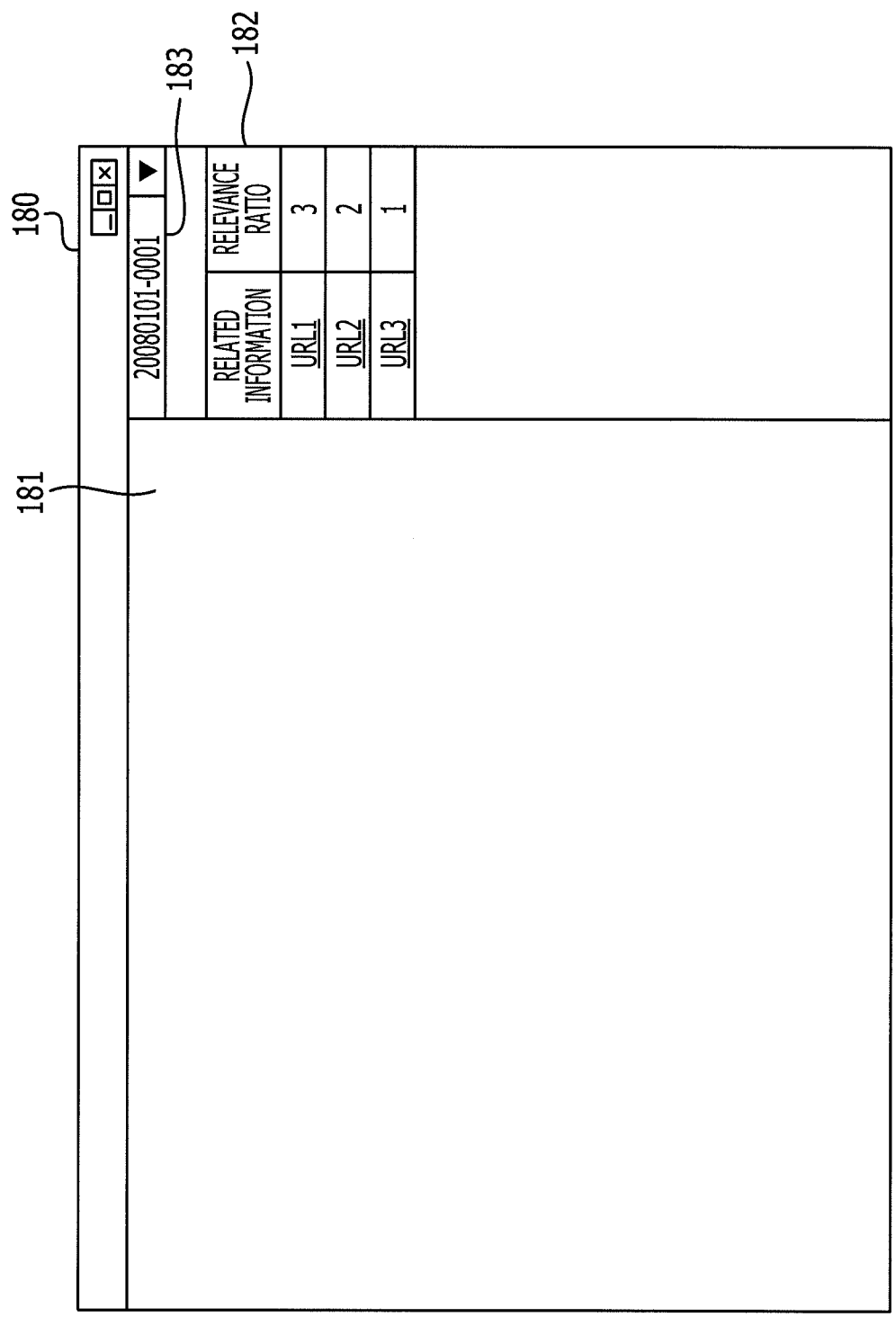
FIG. 18 illustrates an example of a display screen of related information in response to access.

For example, information provided in response to access may be performed by displaying an area 180 illustrated in FIG. 18 on the display unit 20. In the area 180, information obtained by the access processing of the access unit 12 is displayed on an area 181 and information extracted in the extracting unit 17 is displayed on an area 182. In the area 182, extracted addresses are displayed on a space for related information and relevance ratio based on the counted value of each of the extracted addresses is displayed on a space for the relevance ratio. The display screen illustrated in FIG. 18 is a mere example and the access information and the related information may be displayed on different screens. In addition, an input area of an incident ID may be displayed as illustrated in an area 183 of FIG. 18.

Based on an address stored in the storage unit 15, the storage unit 21 may be provided to store information related to an address obtained by the obtaining unit 13 in a format where the information may be extracted desirably.

Figure 19:
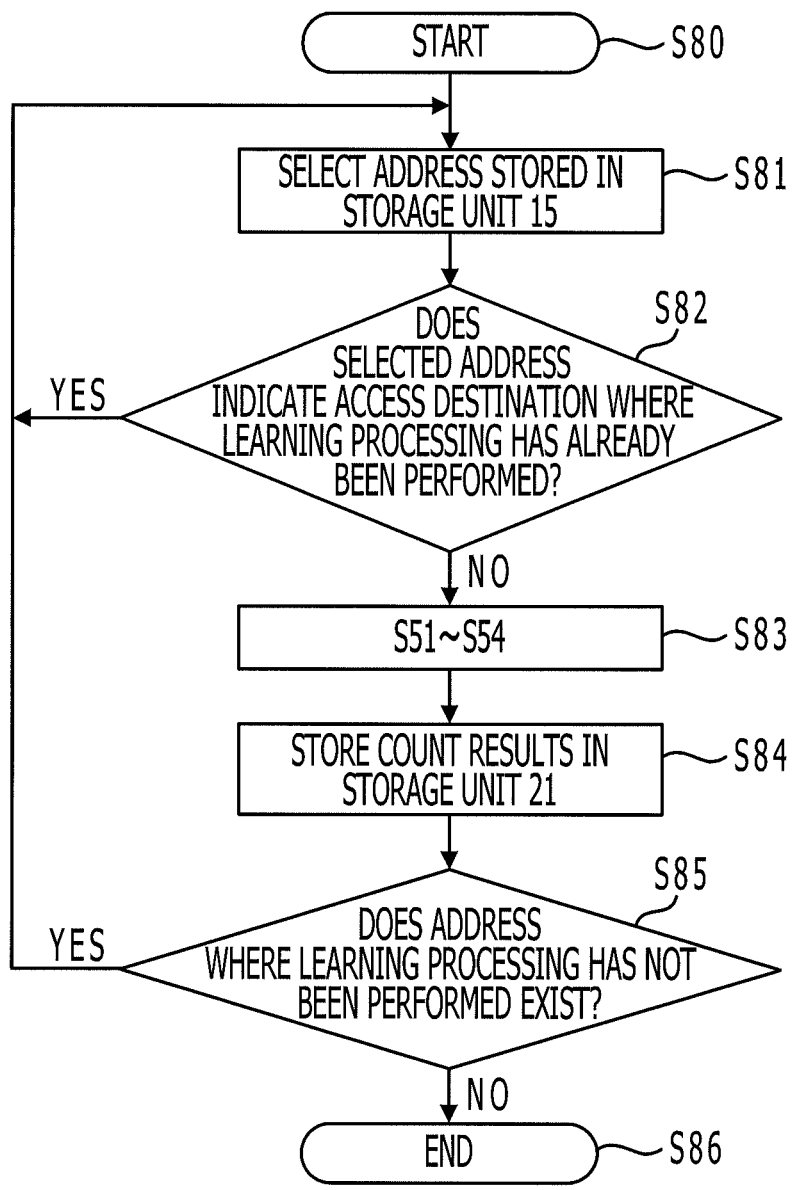
FIG. 19 illustrates a flow of learning processing in the storage unit 21.

FIG. 19 illustrates a flow of learning processing in the storage unit 21. When the learning processing is started (S80), an address is selected from the storage unit 15 (S81). It is checked whether or not the selected address indicates an access destination where the learning processing has already been performed (S82). When the address indicates an access destination where the learning processing has already been performed, the flow returns to S81. When the address does not indicate an access destination where the learning processing has already been performed (that is, when the address indicates an access destination where the learning processing has not been performed yet), addresses related to the selected address are extracted and the processing where the extracted addresses are counted (S51 to S54) is performed (S83). In S83, the addresses related to the address selected in S81 and then the counted number of the addresses are obtained, so that the information including the addresses and the counted number of the addresses are stored in the storage unit 21 (S84). After that, whether or not an address where the learning processing has not been performed exists in the storage unit 15 is checked (S85). When the address exists in the storage unit 15, the flow returns to S81 and when the address does not exist in the storage unit 15, the learning processing ends (S86).

FIGS. 20 and 21 illustrate examples of data stored in the storage unit 21. A table T3 illustrated in FIG. 20 is a corresponding table and indicates addresses in the storage unit 15 and the counted number of other addresses associated with same incidents as each of the addresses in the storage unit 15. Alternatively, the sum of the number of the other addresses associated with the same incidents as each of the addresses is calculated and the counted value of the other addresses is divided by the sum of the number of the other addresses, so that the probability with respect to each of the addresses may be indicated.

A table T4 illustrated in FIG. 21 indicates an selected addresses and other addresses included in same incidents as the selected address and the counted value of the other addresses. Similar to the above-described table T3 illustrated in FIG. 20, the counted value of each of the other addressed is divided by the sum of the number of the other addresses, so that the probability of each of the addresses may be indicated.

When the table T3 or T4 is stored in the storage unit 21 and a certain single row of the table T3 or T4 corresponding to an address obtained by the obtaining unit 13 is read, addresses related to the obtained address may be extracted.

In addition to the mere extraction of related addresses based on a last address obtained by the obtaining unit 13 from the storage unit 15, an extraction of related addresses based on two or more addresses of an incident being currently handled may also be performed. When addresses are extracted based on two or more addresses as described above, in S52, an incident ID associated with an address indicating a same access destination as any one of the two or more addresses may be extracted, or an incident ID associated an address indicating a same access destination as all of the two or more addresses may be extracted. In addition, a same access order as the two or more addresses may be employed as a condition of the extraction process.

FIG. 22 illustrates an example of addresses extracted based on two or more addresses. For example, when addresses are stored in the storage unit 15 in a format as illustrated by the table T2 of FIG. 12 and addresses related to the both "URL1" and "URL2" are extracted, the "URL4", "file1", and "file2" are extracted as illustrated a row of "URL1 and URL2" in FIG. 22. In addition, the counted value of each of the "URL4", "file1", and "file2" may be displayed as "1", respectively.

In addition, when a condition where "URL2" is accessed later than "URL1" is added to the extraction process, the "file1" is extracted as an address as illustrated a row of "URL1→URL2" in FIG. 22.

Moreover, when addresses related to either the "URL1" or "URL2" are extracted, the "file1", "URL4", "file2", and "URL5" (not illustrated) are extracted and the counted value of the "file1" is displayed as "2" as illustrated a row of "URL1 or URL2" in FIG. 22.

Related addresses extracted based on two or more addresses may be stored in the storage unit 21.

The system 1 illustrated in FIG. 1 may apply to a document (e.g., paper, electronic) search system as a second application example.

The access unit 12 may access the paper search system and obtain a paper file.

For example, when records in paper search are managed with respect to research theme in the storage unit 11, the records in paper search managed with respect to research theme may include identification numbers of research theme, obtained summaries of papers, contribution to research theme, etc.

The second application example is performed by similar flow and structure to the first application example. In the second application example, identification numbers and addresses of research theme are associated and stored in the storage unit 15 instead of incident ID. An identification number of research theme held in the holding unit 14 may be changed when records in paper search stored in the storage unit 11 are accessed or may be changed in response to an input of an identification number to an input screen similar to the input screen 150 illustrated in FIG. 15.

In addition, in the creation of records in paper search, the records in paper search may be created so that a new record is referred to the records that have been created. As a result, records of research theme derived from single research theme may be created so that the records of research theme are referred to history in records of the single research theme. For example, when an identification number of research theme is an ID "123456" and new research theme is found from the ID "123456", a record of new research theme may be created as an ID "123456-1". As a result, an identification number of research theme associated with an address may be changed so that research theme where paper belongs keeps clear in paper search.

According to the embodiment, when information related to access is provided, it may be reduced if not eliminated to undesirably associated with addresses each other obtained by accesses based on works of which targets are different and provide the addresses.

According to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware in form of software that is executed by computing hardware (machine). The apparatus (e.g., the system 1, . . . , etc.) can comprise a controller (CPU) (e.g., a hardware logic circuitry based computer processor that processes or executes instructions, namely software/program), computer readable media, transmission communication interface (network interface), and/or an output device, for example, a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be output to an output device, for example, displayed on the display.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. An information processing apparatus comprising:
   an obtaining unit to obtain addresses of information sources in order;
   a storage unit to store a first group of information source addresses included in a plurality of obtained information source addresses until a certain information source address is obtained, and to store a second group of information source addresses included in a plurality of information source addresses obtained after the certain information source address is obtained; and
   an extracting unit when subsequent to storage of the first group of information source addresses an information source address is obtained that matches any information source address of the first group of information source addresses, to extract one or more information source addresses from the first group of information source addresses, or when subsequent to storage of the second group of information source addresses an information source address is obtained that matches any information source address of the second group of information source addresses, to extract one or more information source addresses from the second group of information source addresses.

2. The information processing apparatus according to claim 1, further comprising an outputting unit to output the one or more information source addresses extracted by the extracting unit.

3. The information processing apparatus according to claim 1, further comprising a receiving unit to receive a direction information, wherein
   the storing unit stores a first group of information source addresses included in the plurality of information source addresses obtained until the direction information is received, and stores a second group of information source addresses included in the plurality of information source addresses obtained after the direction information is received.

4. An information processing computer system comprising:
   a storage to store a first group of information source addresses included in a plurality of obtained information source addresses until a certain information source address is obtained, and store a second group of information source addresses included in a plurality of information source addresses obtained after the certain address is obtained;
   a computer that is network connectable to the storage and executes:
      an obtaining unit to obtain the plurality of addresses of information sources in order, and
      an extracting unit when subsequent to storage of the first group of information source addresses an information source address is obtained that matches any information source address of the first group of information source addresses, to extract one or more information source addresses from the first group of information source addresses or when subsequent to storage of the second group of information source addresses, an information source address is obtained that matches any information source address of the second group of information source addresses, to extract one or more information source addresses from the second group of information source addresses.

5. A computer-readable, non-transitory storage medium storing an information processing program for causing a computer to execute a procedure, the procedure comprising:
   obtaining a plurality of information source addresses in order;
   storing a first group of information source addresses included in a plurality of obtained information source addresses until a certain information source address is obtained;
   storing a second group of information source addresses included in a plurality of information source addresses obtained after the certain address is obtained;
   when subsequent to storage of the first group of information source addresses an information source address is obtained that matches any information source address of the first group of information source addresses, extracting one or more information source addresses from the first group of information source addresses; and
   when subsequent to storage of the second group of information source addresses an information source address is obtained that matches any information source address of the second group of information source addresses, extracting one or more information source addresses from the second group of information source addresses.

6. A method for information processing, the method comprising:
   obtaining a plurality of addresses of information sources in order;
   storing a first group of information source addresses included in a plurality of obtained information source addresses until a certain information source address is obtained;
   storing a second group of information source addresses included in a plurality of information source addresses obtained after the certain address is obtained;
   when subsequent to storage of the first group of information source addresses an information source address is obtained that matches any information source address of the second group of information source addresses, extracting one or more information source addresses from the first group of information source addresses; and
   when subsequent to storage of the second group of information source addresses an information source address is obtained that matches any information source address of the second group of information source addresses, extracting one or more information source addresses from the second group of information source addresses.

7. An information processing apparatus comprising:
   a memory that stores a first group of addresses of information sources included in a plurality of obtained information source addresses until a certain information source address is obtained, and stores a second group of information source addresses included in a plurality of information source addresses obtained after the certain information source address is obtained;

a processor that when subsequent to storage of the first group of information source addresses an information source address is obtained that matches any information source address of the first group of information source addresses, extracts one or more information source addresses from the first group of information source addresses, or when subsequent to storage of the second group of information source addresses an information source address is obtained that matches any information source address of the second group of information source addresses, extracts one or more information source addresses from the second group of information source addresses.

8. The apparatus according to claim 7, wherein an information source address match is according to associations of first and second identifiers to the first and second groups of information source addresses.

9. The apparatus according to claim 7, wherein the certain information source address is a designated information source address.

10. The apparatus according to claim 7, wherein a subsequent information source address match is according to associations of first and second identifiers to the first and second groups of information source addresses.

* * * * *

UNITED STATES PATENT AND TRADEMARK OFFICE
CERTIFICATE OF CORRECTION

PATENT NO. : 8,438,176 B2
APPLICATION NO. : 13/049216
DATED : May 7, 2013
INVENTOR(S) : Kuniaki Shimada et al.

It is certified that error appears in the above-identified patent and that said Letters Patent is hereby corrected as shown below:

In the Claims:

Column 18, Line 9, In Claim 4, delete "addresses" and insert -- addresses, --, therefor.

Column 18, Line 10, In Claim 4, delete "addresses," and insert -- addresses --, therefor.

Signed and Sealed this
Twenty-seventh Day of August, 2013

Teresa Stanek Rea
*Acting Director of the United States Patent and Trademark Office*